US012525417B2

(12) United States Patent
Andonissamy et al.

(10) Patent No.: US 12,525,417 B2
(45) Date of Patent: Jan. 13, 2026

(54) ELECTRICAL DEVICE AND POWER CUT-OFF SYSTEM COMPRISING SUCH A DEVICE

(71) Applicant: MERSEN FRANCE SB SAS, Saint-Bonnet-de-Mure (FR)

(72) Inventors: Arokiaraj Andonissamy, Vaulx en Velin (FR); Sébastien Roger Pierre Duboc, La Verpilliere (FR); Guillaume Lemmel, Villeurbanne (FR); Jean-François Oeuvrard, Lyons (FR)

(73) Assignee: MERSEN France SB SAS, Saint-Bonnet-de-Mure (FR)

( * ) Notice: Subject to any disclaimer, the term of this patent is extended or adjusted under 35 U.S.C. 154(b) by 51 days.

(21) Appl. No.: 18/547,608

(22) PCT Filed: Feb. 24, 2022

(86) PCT No.: PCT/EP2022/054708
§ 371 (c)(1),
(2) Date: Aug. 23, 2023

(87) PCT Pub. No.: WO2022/180182
PCT Pub. Date: Sep. 1, 2022

(65) Prior Publication Data

US 2024/0136136 A1 Apr. 25, 2024
US 2024/0234067 A9 Jul. 11, 2024

(30) Foreign Application Priority Data

Feb. 25, 2021 (FR) ....................................... 2101841

(51) Int. Cl.
*H01H 85/02* (2006.01)
*H01H 39/00* (2006.01)

(52) U.S. Cl.
CPC ...... *H01H 85/0241* (2013.01); *H01H 39/006* (2013.01)

(58) Field of Classification Search
CPC .......................... H01H 39/006; H01H 85/0241
See application file for complete search history.

(56) References Cited

U.S. PATENT DOCUMENTS 3,805,208 A * 4/1974 McAlister ............ H01H 85/044 337/228
11,056,306 B2 7/2021 Gaudinat et al.
(Continued)

FOREIGN PATENT DOCUMENTS

DE 2055050 A1 7/1971
FR 1297273 A 6/1962
(Continued)

OTHER PUBLICATIONS

Search Report for International Application No. PCT/EP2022/054708 dated May 11, 2022.
(Continued)

*Primary Examiner* — Jacob R Crum
(74) *Attorney, Agent, or Firm* — McDonald Hopkins LLC

(57) ABSTRACT

Electrical device comprising a body defining a closed inner space, a first electrode, a second electrode and a third electrode, a free end of each electrode opening inside the inner space, the free ends of each electrode being arranged, inside the inner space, apart from one another and opposite the other electrodes, the electrical device being configured to prohibit the current from flowing between the first electrode and the third electrode when the electric current or the electric voltage between the first electrode and the second electrode remains below a predefined threshold value; when the electric current or the electric voltage exceeds the
(Continued)

Figure 1:
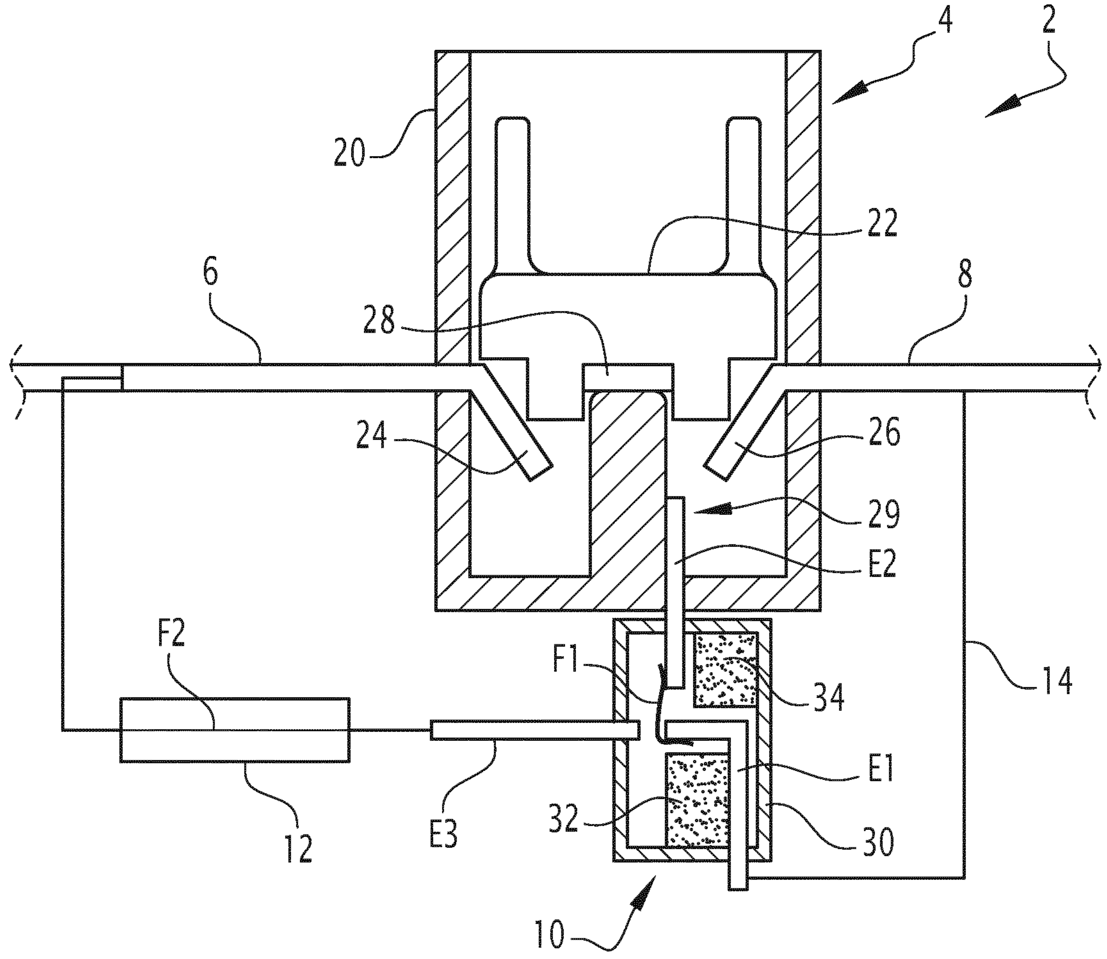

threshold value, allow the current to flow between the first electrode and the third electrode.

13 Claims, 8 Drawing Sheets

(56) References Cited

U.S. PATENT DOCUMENTS

| | | | | |
|---|---|---|---|---|
| 2013/0293343 | A1* | 11/2013 | Xu | H01C 3/20 338/269 |
| 2015/0207308 | A1 | 7/2015 | Buhler et al. | |
| 2015/0248979 | A1* | 9/2015 | Parks | H01H 39/004 200/61.08 |
| 2019/0198278 | A1* | 6/2019 | Zhou | H01H 85/38 |
| 2020/0286703 | A1 | 9/2020 | Tazarine et al. | |
| 2022/0246377 | A1 | 8/2022 | Gerlaud et al. | |

FOREIGN PATENT DOCUMENTS

| | | | |
|---|---|---|---|
| FR | 3098006 | A1 | 1/2021 |
| WO | 2018167169 | A1 | 9/2018 |
| WO | 2020260382 | A1 | 12/2020 |
| WO | 2022180182 | A1 | 9/2022 |

OTHER PUBLICATIONS

Search Report for French Application No. 21 01841 dated Nov. 17, 2021.

* cited by examiner

ELECTRICAL DEVICE AND POWER CUT-OFF SYSTEM COMPRISING SUCH A DEVICE

CROSS-REFERENCE TO RELATED APPLICATIONS

This is a National Stage application of PCT international application PCT/EP2022/054708, filed on Feb. 24, 2022, which claims priority from French Patent Application No. 21 01841, filed on Feb. 25, 2021, both which are incorporated herein by reference in their entirety.

The invention relates to an electrical device and an electrical system for interrupting an electrical current.

In particular, the invention is applicable to the field of electrical protection.

For a long time, fuses efficiently protected electrical equipment and installations against electrical faults.

Fuses typically include a fuse blade placed in a housing filled with a material such as silica. The blade is configured for melting when the current flowing through the fuse exceeds a predetermined value for a certain length of time.

Today, certain contemporary applications require the ability to interrupt a high intensity electric current with a very fast reaction time. Such is the case e.g. for applications related to electric vehicles or to photovoltaic panels.

In this respect, it has been proposed to associate a pyrotechnic circuit breaker with a conventional fuse, in order to increase the breaking performance.

WO 2018/167169 A1 describes an example of such an electrical device, wherein a fuse is connected in parallel with a pyrotechnic circuit breaker.

In said example, the pyrotechnic circuit breaker is configured for tripping with a very short reaction time in the event of an electrical fault, and the fuse is configured for ensuring the complete interruption of the current, e.g. to prevent any reformation of an electric arc in the pyrotechnic circuit breaker.

In other words, the fuse helps to interrupt an electrical current that the circuit breaker alone could not have safely and effectively interrupted.

However, the fuse should not be connected in parallel with the circuit breaker until the moment the circuit breaker is tripped, so as to prevent an electric current from permanently flowing through the fuse, which would lead to a premature aging of the fuse.

Moreover, certain known devices do not allow the circuit to be opened when the currents have a low or even (temporarily) zero intensity, which may nevertheless be required for certain applications.

To achieve the above, it is generally necessary to modify the internal architecture of the pyrotechnic circuit breaker, as proposed by WO20260382 A1, which can however, be complicated to achieve industrially.

There is thus a need for an electrical switchgear which overcomes the aforementioned drawbacks.

According to one aspect, the invention relates to an electrical device including a body delimiting a closed internal volume, a first electrode, a second electrode and a third electrode, a free end of each electrode opening into the internal volume, said free ends of each electrode being arranged inside the internal volume, at a distance from each other and opposite with respect to the other electrodes, the electrical device being configured for:

- prohibiting the flow of current between the first electrode and the third electrode when the electric current or the electric voltage between the first electrode and the second electrode stays below a predefined threshold value;
- letting the current flow between the first electrode and the third electrode when said electric current or said electric voltage exceeds said threshold value.

According to advantageous but non-mandatory aspects, such a device can incorporate one or a plurality of the following features, taken individually or according to any technically permissible combination:

- the device includes an electrically conducting element connecting the first electrode to the second electrode, the fuse element being configured for changing when the current flowing therethrough exceeds said threshold value;
- the device includes an electrically conducting fuse element, such as a wire, connecting the first electrode to the second electrode, the fuse element being configured for melting when the current flowing through the fuse element exceeds said threshold value;
- the device includes a deformable conductor shape memory element connecting the first electrode to the second electrode, the conductor element being configured for deforming and breaking the electrical contact between the first electrode and the second electrode when the current flowing therethrough exceeds said threshold value;
- the free ends of the first electrode and the second electrode are partially separated by an electrically insulating barrier;
- inside the volume, the free end of the third electrode is separated from the free ends of the first electrode and the second electrode by a fuse wall;
- the first electrode, the second electrode and the third electrode are spaced apart and separated by a volume of gas, such as air, the breakdown voltage between the second electrode and the first electrode being lower than the breakdown voltage between the second electrode and the third electrode;
- the second electrode is off-centered with respect to the first electrode and to the third electrode;
- the body has a tubular shape, the first electrode and the third electrode being aligned with each other and opening onto opposite faces of the tubular body, the second electrode opening into the body through the cylindrical wall of the body, off-center with respect to the first electrode and to the third electrode.

According to another aspect, the invention relates to an electrical system for interrupting an electrical current, including a circuit breaker, a fuse and an electrical device according to any of the preceding claims, the electrical device being connected in series with the fuse, the fuse and the electrical device being connected together in parallel with the circuit breaker via the first electrode and the third electrode, the second electrode opening into a breaking chamber of the circuit breaker.

According to advantageous but non-mandatory aspects, such an electrical system can incorporate one or a plurality of the following features, taken individually or according to any technically permissible combination:

- the second electrode is connected to an internal electrical conductor of the circuit breaker before or after actuation of the circuit breaker, the internal conductor being coupled to at least one of the terminals of the circuit breaker;

- the second electrode is connected to the internal electrical conductor via an insulating element such as a voltage suppressor element or a varistor;
- the system includes an additional circuit breaker connected in series with said circuit breaker by the respective terminals thereof, the second electrode being connected to the junction between said circuit breakers;
- the second electrode is placed, in the breaker enclosure, opposite and at a distance from one of the terminals of the circuit breaker;
- the fuse and the electrical device are integrated within the same body;
- the circuit breaker and the electrical device are integrated within the same body;
- the circuit breaker is a pyrotechnic circuit breaker.

Figure 2:
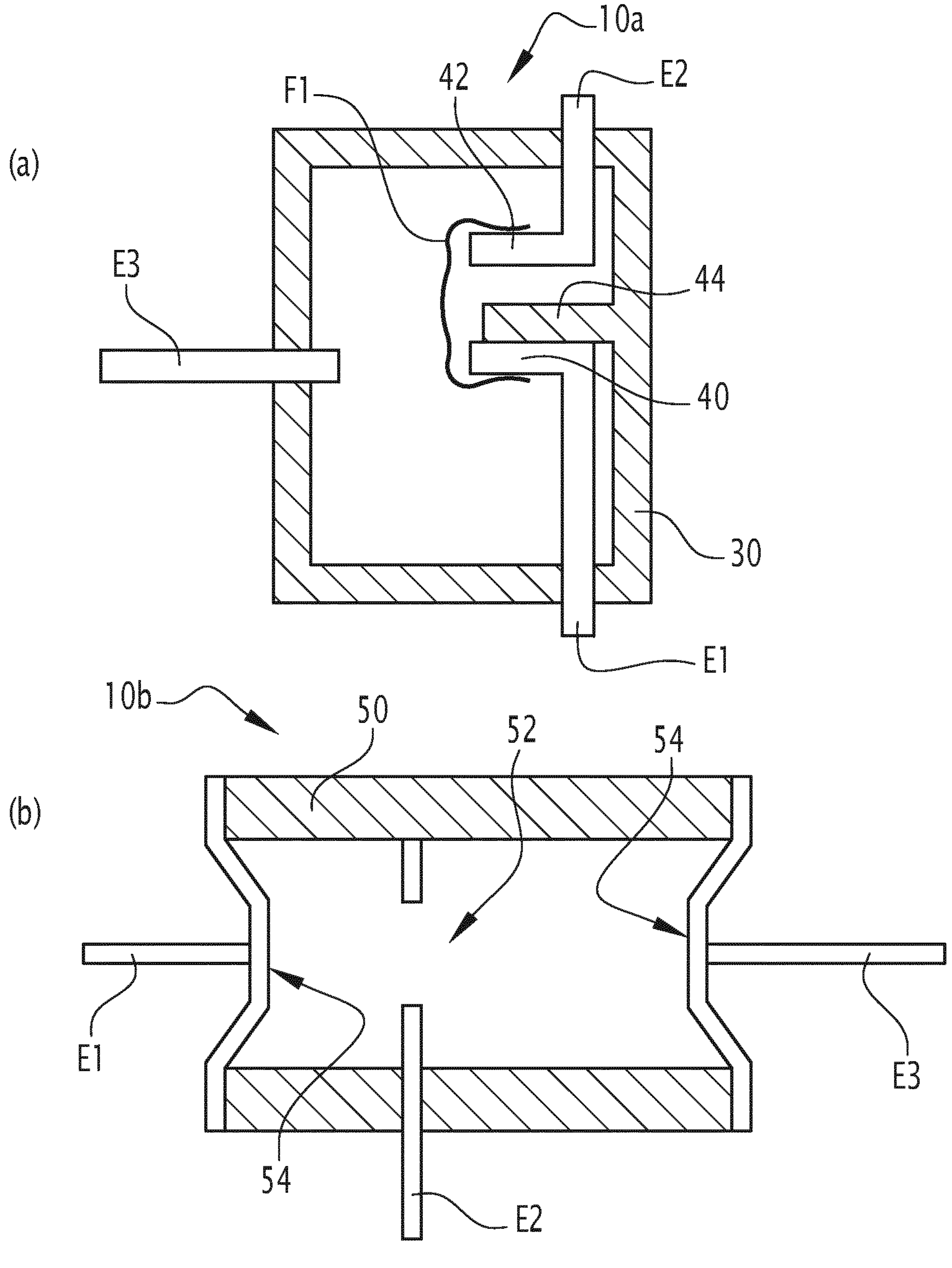
Figure 3:
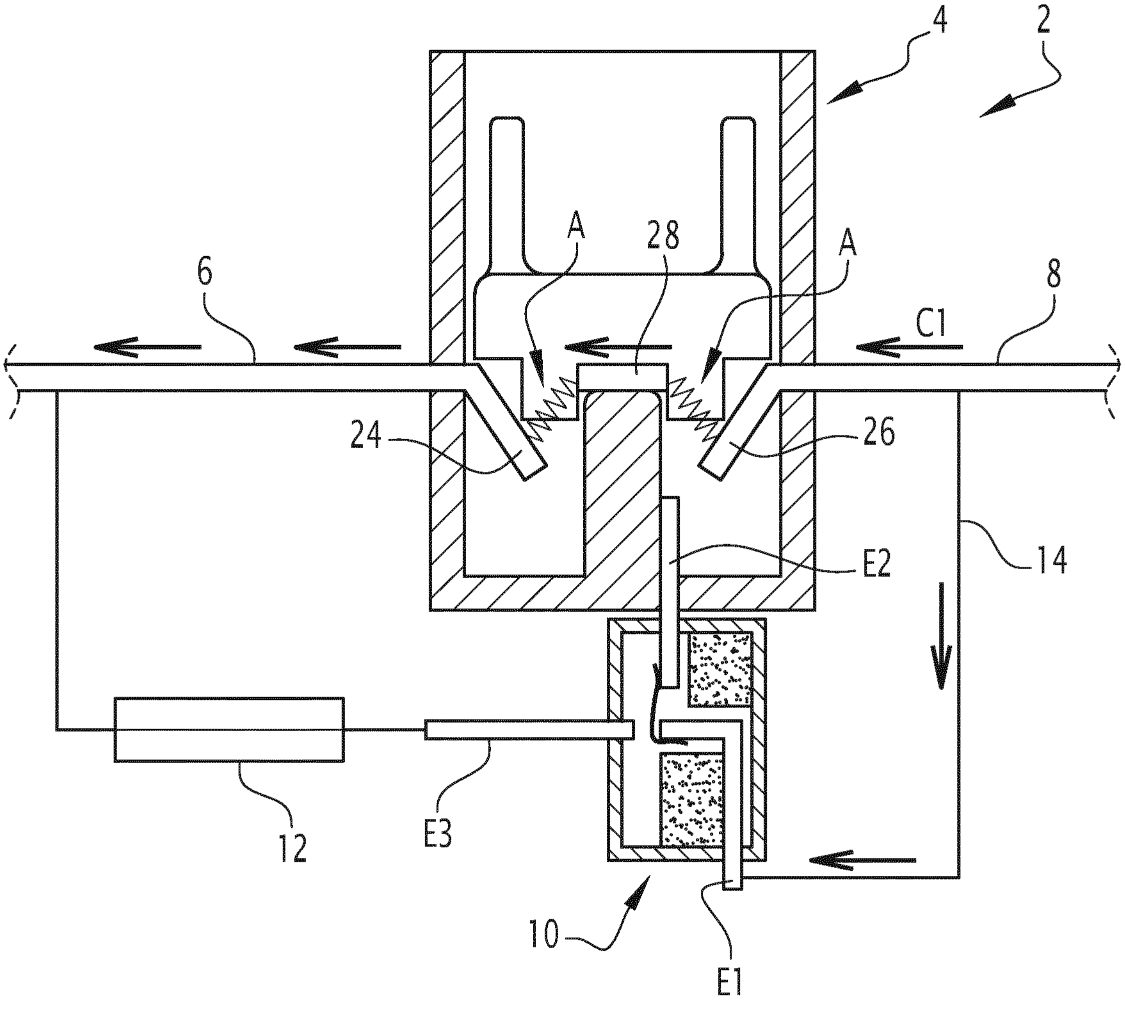
Figure 4:
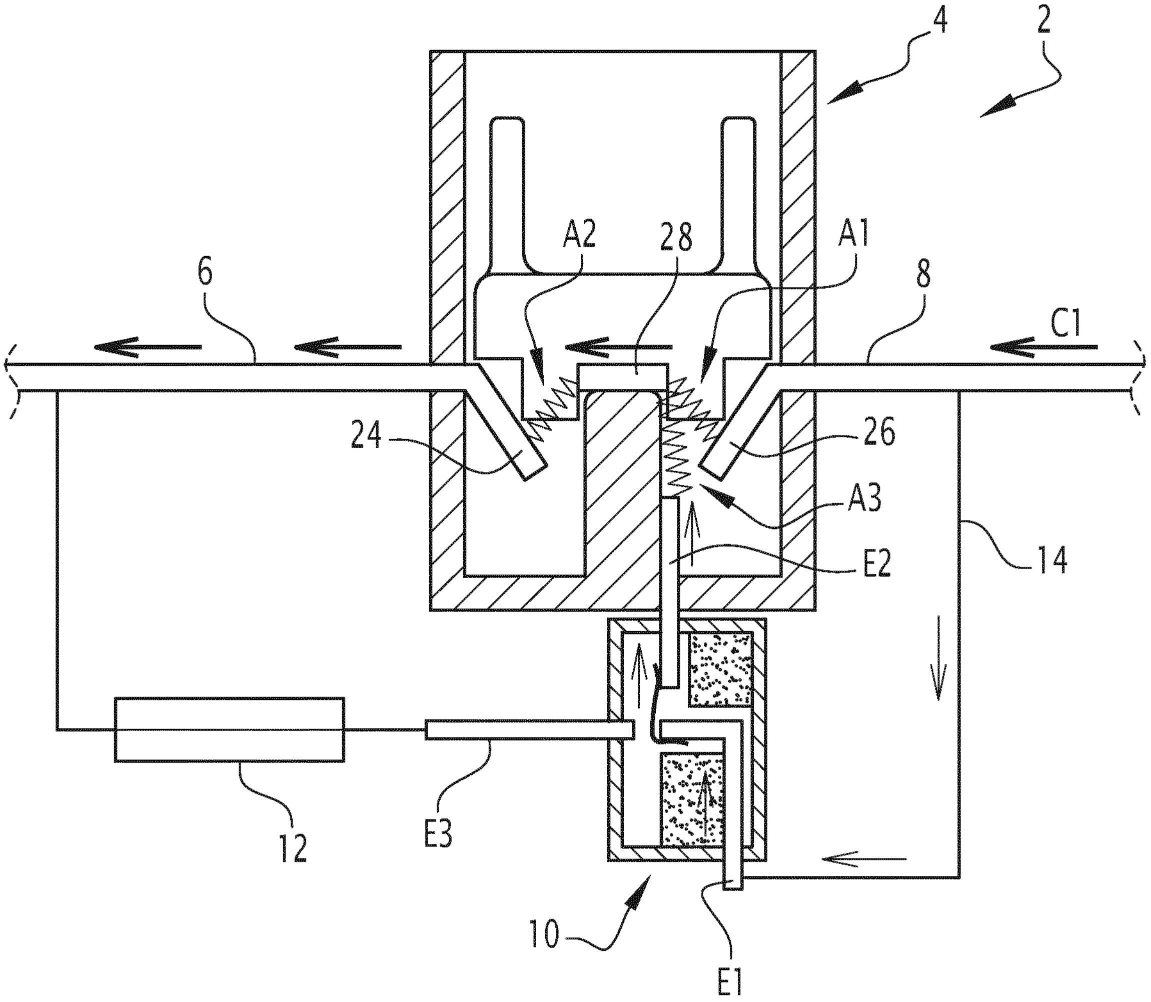
Figure 5:
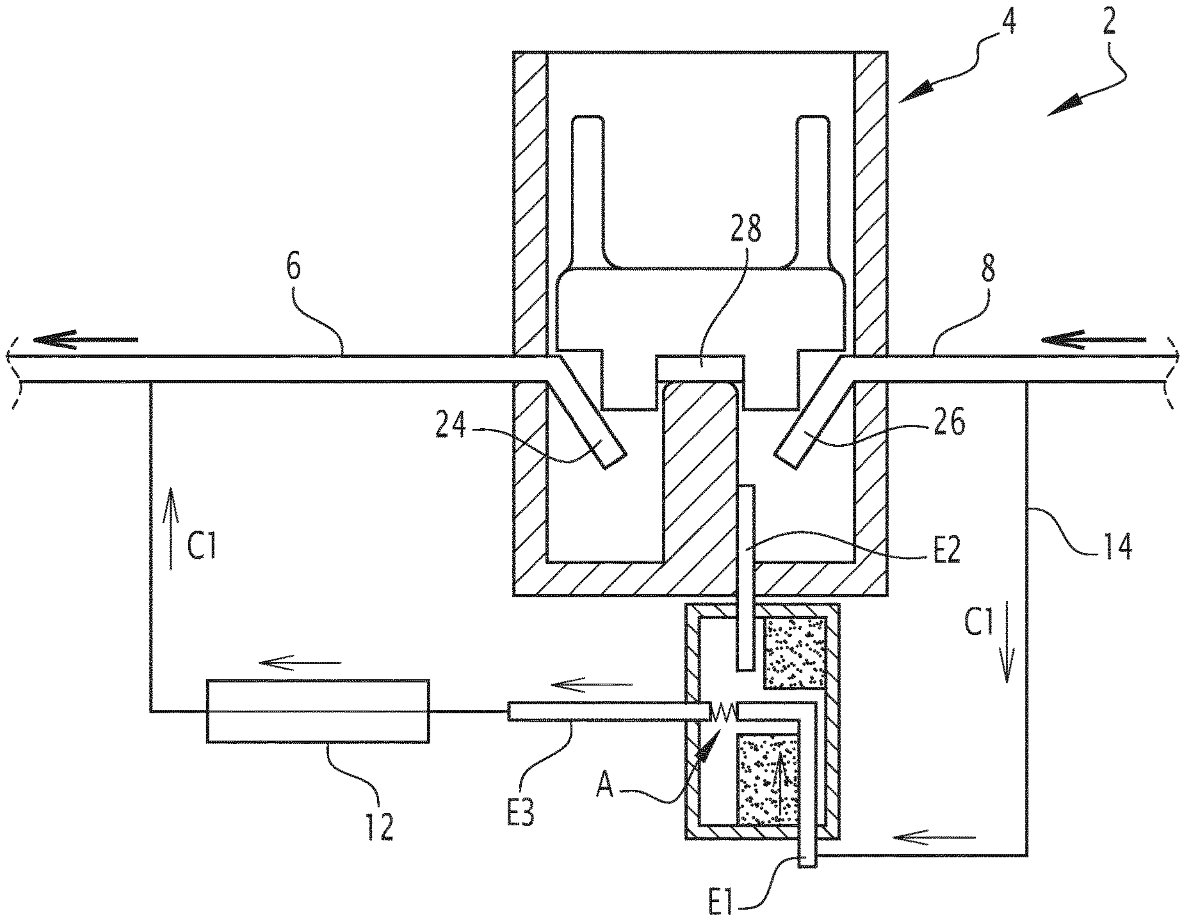
Figure 6:
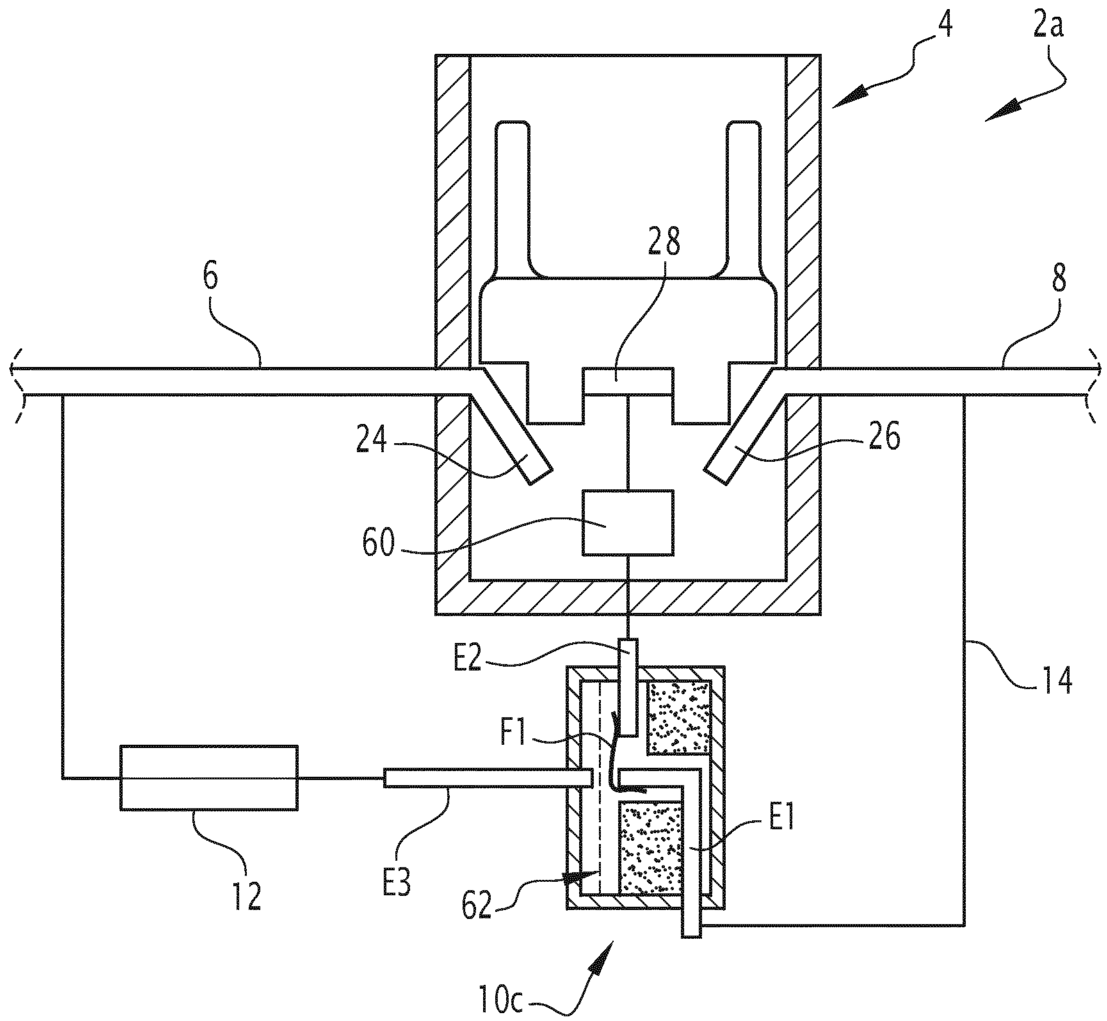
Figure 7:
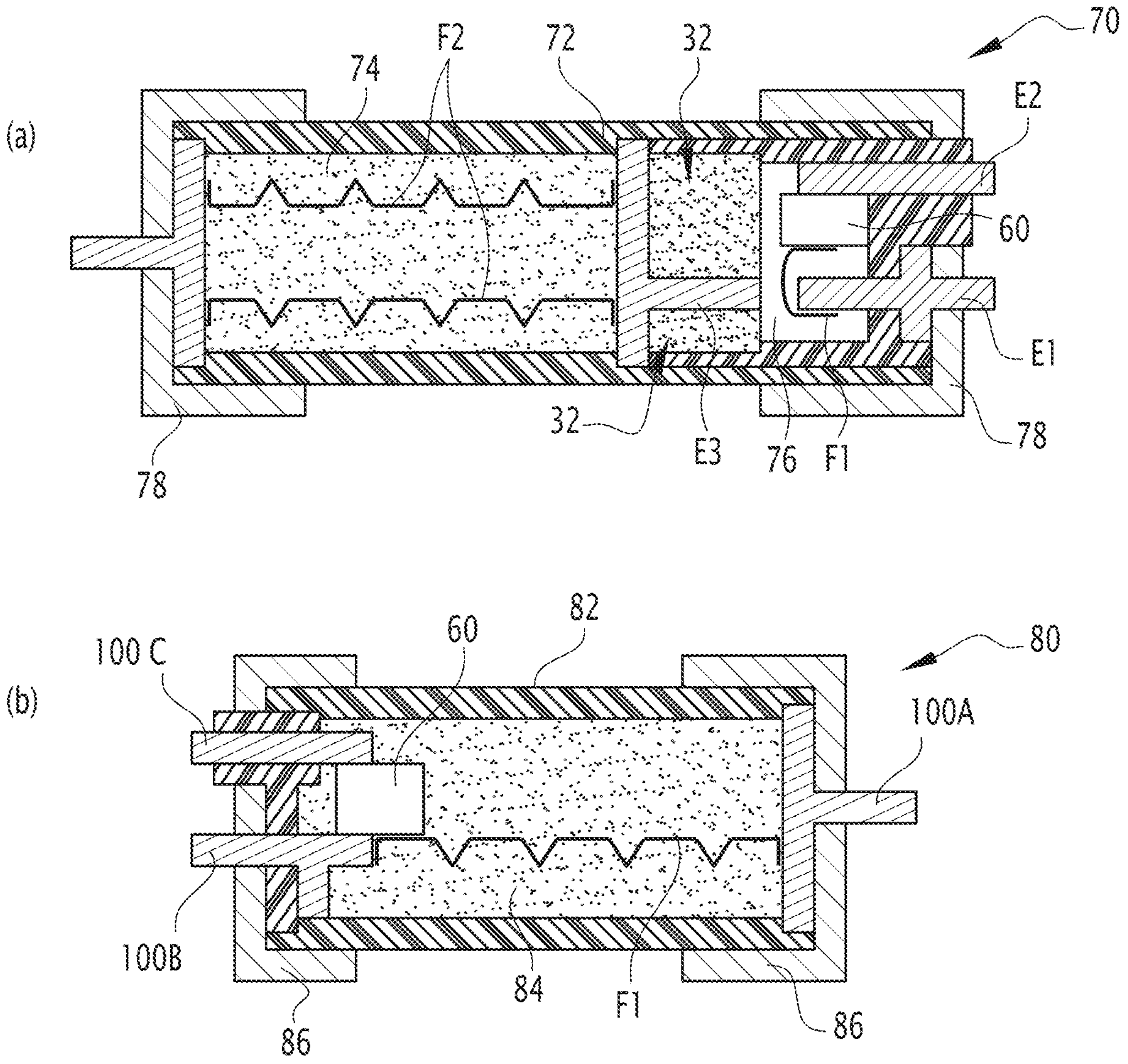
Figure 8:
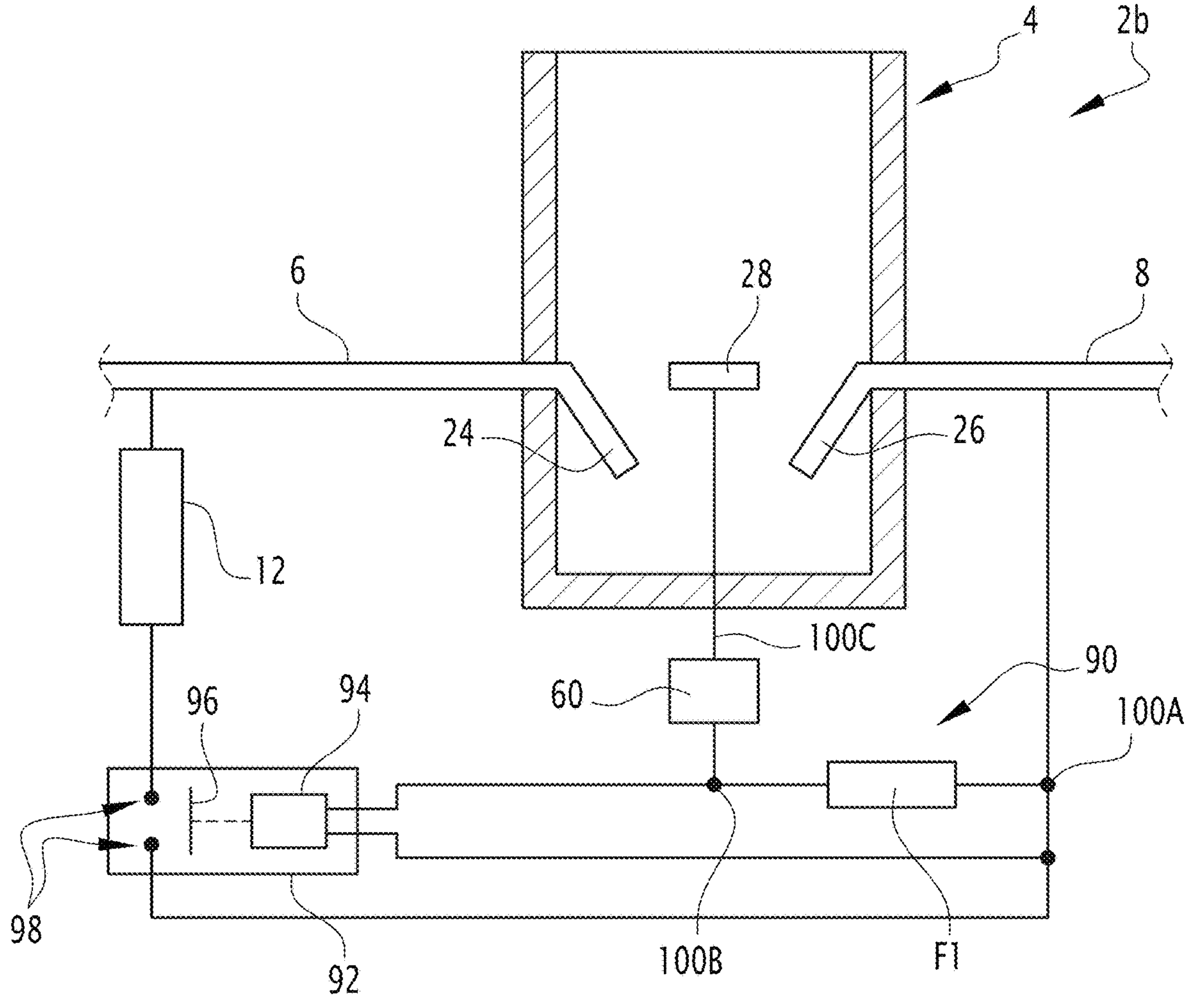

The invention will be better understood and other advantages thereof will appear more clearly in the light of the following description of an embodiment of a device for breaking an electrical current, given only as an example and made with reference to the enclosed drawings, wherein:

FIG. 1 schematically shows a device for interrupting an electrical current including an electrical breaking element according to embodiments of the invention;

FIG. 2 schematically shows two alternative embodiments of the electrical breaking element of the device shown in FIG. 1;

FIG. 3 schematically represents a first state of operation of the device shown in FIG. 1;

FIG. 4 schematically represents a second state of operation of the device shown in FIG. 1;

FIG. 5 schematically represents a third state of operation of the device shown in FIG. 1;

FIG. 6 schematically represents another embodiment of a device shown in FIG. 1;

FIG. 7 is a schematically represents two examples of the construction of an electrical breaking element for the breaking device shown in FIGS. 1 and 6 (insert a) and for the breaking device of FIG. 8 (insert b), respectively;

FIG. 8 schematically represents another embodiment of the device shown in FIG. 1.

FIG. 1 represents an embodiment of an electrical system 2 configured for interrupting an electrical current, e.g. so as to protect an electrical load or an electrical installation.

The device 2 includes a circuit breaker 4 including terminals 6 and 8, making it possible to connect the circuit breaker 4 to an electrical circuit, e.g. between an electrical load and a generator.

The device 2 further includes an electrical device 10 and a fuse 12 electrically connected in parallel with the circuit breaker 4 between the terminals 6 and 8.

For example, the fuse 12 is a fuse cartridge including one or a plurality of fuse blades F2.

In general, the circuit breaker 4 can be switched from an electrically conducting state to an electrically blocking (or open) state.

The circuit breaker 4 can be a pyrotechnic circuit breaker. For example, the circuit breaker 4 can include an explosive charge configured, when triggered, for physically cutting an electrical conductor extending between the terminals 8 and 6 of the circuit breaker 4.

In the example illustrated, the circuit breaker 4 includes a body 20 and a breaking member 22 (such as a piston) configured for moving in translation within the body 20 e.g. following the triggering of a pyrotechnic charge (not illustrated).

The breaking member 22 is configured for isolating an internal electrical conductor housed inside the body 20, the electrical conductor connecting the terminal 6 to the terminal 8.

In FIG. 1, the circuit breaker 4 is illustrated in a tripped position. The electrical conductor, isolated by the breaking member 22, is divided between a first portion 24 which continues the first terminal 6, a second portion 26 of conductor which continues the second terminal 8, and an intermediate portion 28 situated between the first and second portions 24, 26 of the electrical conductor.

An electrode 29, the role of which will be specified hereinafter, is arranged in the breaking chamber, so that the free end thereof is placed opposite and at a distance from one or other of the portions 24 or 26.

The electrode 29 can be made of any conductor material, e.g. aluminum, tungsten, or preferentially copper (in particular for cost reasons). The electrode 29 can be molded directly into the body 20 (to improve sealing).

According to alternative embodiments, the circuit breaker 4 can be a fuse cartridge, or an electromechanical device, such as e.g. an electromagnetic contactor, or a semiconductor switch, or any other suitable device.

The electrical device 10 includes a body 30 delimiting a closed internal volume, a first electrode E1, a second electrode E2 and a third electrode E3.

The electrodes E1, E2, E3 can be made of any electrically conducting material, e.g. aluminum, tungsten, or preferentially copper (in particular for cost reasons). To optimize costs, the electrodes E1, E2, E3 can each be made of a different material. The electrodes E1, E2, E3 can be overmolded directly into the body 30 (to improve sealing)

The body 30 is preferentially made of an electrically insulating material, e.g. plastic, or thermoset polymer, e.g. polyamide PA6.6.

The electrodes E1, E2 and E3 are configured in such a way that a free end of each electrode opens into the volume delimited by the body 30.

Said free ends of each electrode E1, E2, E3 are arranged, inside the internal volume defined by the body 30, at a distance from one another and opposite with regard to the other electrodes.

In the example shown, the body 30 has the shape of a pad. The electrodes E1, E2 and E3 open out into the body 30 via different faces of the body 30.

In such example, the electrode E1 is connected to the terminal 8 by an electrical conductor 14. The end 29 of the electrode E2 (or of any electrode connected to the electrode E2) opens into the breaking chamber of the circuit breaker 4. The third electrode E3 is connected to one terminal of the fuse 12, the other terminal of the fuse being connected to the terminal 6.

Other examples are possible. However, in practice, the electrical device 10 is connected in series with the fuse 12, the fuse and the electrical device being connected together in parallel with the circuit breaker 4 via the first electrode and the third electrode, the second electrode opening into a breaking chamber of the circuit breaker.

In general, the device 10 is configured for:

- prohibiting the flow of current between the first electrode E1 and the third electrode E3 when the electric current or the electric voltage between the first electrode E1 and the second electrode E2 stays below a predefined threshold value;
- letting an electric current flow between the first electrode E1 and the third electrode E3 as soon as the electric current or the electric voltage between the first electrode and the second electrode exceeds a predefined threshold value.

In a preferred embodiment, the device 10 includes an electrically conducting fuse element F1, such as copper or silver wire, connecting the first electrode E1 to the second electrode E2, the fuse element being configured for melting when the current flowing through the fuse element exceeds the threshold value. The electrically conducting fuse element F1 can also be a tape, or a strip, or a ribbon cable or a ribbon wire, or any other suitable connection structure, the electrically conducting fuse element F1 preferentially being made of metal. In order to produce the fuse element, a person skilled in the art can refer to the prior art known in the production of electrical circuit protection fuses.

In such case, the device 10 is specifically configured for:

letting an electric current flow between the first electrode E1 and the second electrode E2 as long as the current stays below a predefined threshold value (while preventing the flow of current between the first electrode E1 and the third electrode E3);

when said current exceeds said threshold value, also letting the current flow between the first electrode E1 and the third electrode E3, and possibly interrupting the flow of current between the first electrode E1 and the second electrode E2.

In other words, the device 10 makes it possible to divert the electric current coming from the first electrode E1 and send same from the second electrode E2 to the third electrode E3, depending on the value of the electric current.

Thereby, when the energy released by the current flowing in F1 is less than the threshold value, the current flows from the first electrode E1 to the second electrode E2. When the energy released by the current flowing through F1 exceeds the threshold, the fuse element F1 melts. The above leads to the occurrence of an electric arc A between the first electrode E1 and the second electrode E2. The arc A is then diverted to be established between the first electrode E1 and the third electrode E3.

It will thus be understood that the layout, the design and the spacing of the electrodes E1, E2, E3 and the free ends thereof are chosen accordingly. For example, the distance D1 between E1 and E2 can be defined to be greater than the distance D2 between E1 and E3, typically D1 being greater than or equal to 1.2 times D2. The consequence therefrom is to enhance the deviation of the arc A from E2 to E3.

For example, the first and third electrodes E1 and E3 have the respective terminal ends thereof aligned with each other. The terminal end of the first electrode is herein curved and has an L-shape.

For example, the end of the electrode E3 can be tapered and pointed in order to enhance the attraction of the arc A.

In practice, the first electrode E1, the second electrode E2 and the third electrode E3 are spaced apart from each other and separated by a volume of gas, such as air.

Optionally, the volume delimited by the body 30 can include one or a plurality of energy absorbing elements 32, 34, such as a metal foam or a ball of stainless-steel wire, or silica, or any suitable material, which contributes to cooling the interior of the body 30 and to attenuate the electric arc in case of exceeding the current threshold.

The inserts (a) and (b) of FIG. 2 illustrate two possible variants of the device 10.

The insert (a) represents a first alternative embodiment 10*a* of the device 10 shown in FIG. 1.

The device 10*a* is overall identical to the device 10 and has a similar operation, except that the terminal ends 40, 42 of the electrodes E1 and E2, respectively, are curved and have an L-shape.

Furthermore, the free ends 40, 42 of the first electrode and of the second electrode are partially separated by an electrically insulating barrier 44.

For example, the insulating barrier 44 is made of the same material as the body 30.

The fuse element F1 is then U-shaped, which facilitates the diversion of the electric arc towards the third electrode E3.

The insert (b) represents a second alternative embodiment 10*b* of the device 10 shown in FIG. 1.

In such embodiment, the fuse conductor element F1 is omitted and replaced by an air gap, e.g. filled with air.

In such case, the threshold is an electrical voltage threshold. Dielectric breakdown in the air between the electrodes E1 and E2 is caused when the voltage generated by the electric arc A1 (described hereinafter) established between conductors 26 (connected to E1) and 28 (connected to E2) exceeds a threshold value.

In such embodiment, the device is arranged in such a way that the breakdown voltage between the first electrode and the second electrode E2 is lower than the breakdown voltage between the first electrode E1 and the third electrode E3.

Such characteristic can be obtained by adjusting the positioning of the second electrode E2 with respect to the electrodes E1 and E3. Another way of obtaining such characteristic is to interpose a fuse wall (similar to the fuse wall 62 described hereinafter) between the first electrode E1 and the second electrode E2, and/or between the second electrode E2 and the third electrode E3, the properties of the walls being chosen accordingly so as to melt as of a specific voltage (and therefore energy) threshold. Such solutions can also be combined.

According to one possible implementation, the body 50 of the device 10*b* has a tubular or cylindrical shape. The first electrode E1 and the third electrode E3 are aligned with each other and with the tubular body and open onto opposite faces of the tubular body. The second electrode E2 opens into the body 50 through the cylindrical wall of the body, in an off-centered way (or asymmetrically) with respect to the first electrode E1 and to the third electrode E3. In other words, the second electrode E2 is off-centered (or asymmetrical) with respect to the first electrode E1 and to the third electrode E3. In such case, preferentially, the distance between the electrodes E1 and E3 is greater than 1.2 times the distance between the electrodes E1 and E2.

For example, the end faces 52, 54 of the body 50 can have a tapered or trapezoidal shape. Optionally, the inner wall of said faces can include electrically conducting contact pads.

Nevertheless, other further embodiments (not shown) are possible.

For example, according to a variant, the fuse conductor element F1 can be replaced by a bimetallic strip, or more generally by an electrical conductor made of shape memory material, connecting the first electrode E1 to the second electrode E2.

The bimetallic strip is configured for deforming and interrupting the electrical contact between the first electrode E1 and the second electrode E2 when the current flowing therethrough exceeds said threshold value.

The above then allows the current to flow from the first electrode E1 to the third electrode E3, e.g. by forming an electric arc, or by placing the bimetallic strip in direct contact with the third electrode E3.

Thereby, it will be understood that, in many possible embodiments, including the embodiment shown in FIG. 1, the device 10 includes an electrically conducting element connecting the first electrode E1 to the second electrode E2, the electrically conducting element being configured for being modified when the current flowing therethrough exceeds said threshold value.

For example, in the case where the electrically conducting element is the fuse element F1, said modification consists of melting of the fuse element F1. In the case where the electrically conducting element is a deformable shape memory material, such as a bimetallic strip, the modification consists in a deformation.

Each of such embodiments can be implemented independently of the previous embodiments.

In the present description, the operation of the system 2 is described only with reference to the embodiments of the device 10 based on the fuse conductor F1. However, it will be understood that such explanations can be transposed to the other embodiments of the device 10, in particular to the alternative embodiments presented hereinabove.

In general, the device 10, as well as the variants thereof, can be used independently of the electrical system 2.

An example of operation of the electrical system 2 is illustrated by means of FIGS. 3, 4, and 5.

FIG. 3 shows a first state of the system 2 immediately after the tripping of the circuit breaker 4. The internal conductor was cut into portions 24, 26 and 28 by the breaking member 22. The electric current C1 coming from the terminal 8 continues to flow through the circuit breaker, because electric arcs, denoted by A, have formed on the one hand between the conductor portions 24 and 26 and on the other hand between the conductor portions 26 and 28.

FIG. 4 shows a second state of the system 2 subsequent to the first state. The electric current C1 continues to flow through the circuit breaker 4 because of the presence of the electric arcs A1 and A2.

In parallel, since the electrode E1 is connected to the terminal 8, part of the electric current flows between first electrode E1 and the second electrode E2, flowing through the fuse conductor element F1. Said current also flows between the second electrode E2 and the central conductor portion 28, due to the occurrence of another electric arc A3 between said two elements. Preferentially, the arrangement of the end 29 in the vicinity of the conductor 28 enhances the extinction of the arc A1 to the benefit of the arc A3.

The energy supplied by the electric current flowing through the fuse conductor element F1 increases during the time taken by the circuit breaker to act against the flow of current, by means of the voltage generated by the electric arcs A1 and A2 then A2 and A3. Depending on the value of the current C1 flowing in the circuit breaker 4 when the latter is tripped, two scenarios are possible:

In a first case, if the energy supplied by the current flow through the fuse conductor element F1 is less than the melting energy of the fuse conductor element, then the fuse conductor element F1 does not melt. The above means that the voltage generated by the electric arcs A1 and A2 and then A2 and A3 alone was sufficient to oppose and cancel the flow of current. In this case, the current C1 is canceled while the fuse F1 is simply heated, but not melted, by the Joule effect. The final electrical insulation is provided in the circuit breaker by the distances between the free ends of the conductors, and in the device 10 by the distance in air between the electrodes E1 and E3 (or the wall 62 if present).

In a second case, if the energy supplied by the current flow through F1 exceeds the melting energy threshold ($I^2t$) specific to the fuse conductor element F1, this leads to the melting of the fuse conductor element and leads to the occurrence of an electric arc (not illustrated) between the first electrode E1 and the second electrode E2 instead of the fuse element F1.

FIG. 5 shows a third state of the system 2, subsequent to the second state. After the melting of the fuse conductor element F1, the electric arc A established between the first electrode E1 and the second electrode E2 is diverted so as to be established between the first electrode E1 and the third electrode E3 (electric arc A in FIG. 5).

Indeed, the air surrounding the ends of the electrodes is ionized by the electric arc A. The electric arc A is attracted by the third electrode E3, which is at the same potential as the terminal 6. The difference of potential between the first electrode E1 and the second electrode E2 is less than the difference of potential between the first electrode E1 and the third electrode E3.

All of the current C1 coming from the terminal 8 is then diverted by the device 10 and ceases to flow through the circuit breaker 4, leading to the extinction of the electric arcs A2 and A3 in the circuit breaker 4.

The fuse 12 then melts so as to interrupt the flow of the electric current C1. The flow of current in the electrical system 2 is then interrupted.

The final electrical isolation is provided in the circuit breaker by the distances between the free ends of the conductors, and by the fuse F2.

Since the electrical current does not permanently flow through the fuse 12 between the terminals 6 and 8 of the circuit breaker 4 in normal times (the fuse 12 is protected from said current by the device 10), then the service life of the fuse 12 can be extended. The reliability of the electrical system 2 is thereby increased.

Preferentially, the characteristics of the fuse 12 (in particular, the current rating, the breaking capacity and the voltage rise profile) are chosen according to the cooling time of the ionized gases in the housing 30.

It will be understood that in practice, the device 10 is a passive device, i.e. the diversion of the electric arc by the device 10 does not require any actuation of the device 10 by an external action, such as a trip device or a manual control, unlike e.g. the circuit breaker 4.

FIG. 6 shows a first alternative embodiment 2*a* of the electrical system 2 shown in FIG. 1.

The electrical system 2*b* is generally identical to the system 2 and has a similar operation, except that the second electrode E2 is henceforth connected to the central conductor portion 28, instead of opening freely into the breaking chamber.

In other words, the second electrode is connected to an internal electrical conductor (the central portion 28 of the circuit breaker 4), the internal conductor being coupled to at least one of the terminals 6, 8 of the circuit breaker 4.

The second electrode E2 can either be connected directly to the central portion 28, or be connected indirectly via an air gap e.g. by being placed at a distance of at least 0.1 mm from the central portion 28. Such latter variant avoids in particular a premature wear of the fuse element F1 by preventing the circulation through the fuse conductor element F1 of a low current, derived from the current C1 when the circuit breaker is in the closed position (conducting state).

In a variant (not shown), the central portion 28 can be movable or deformable over a travel greater than or equal to the distance separating same from the electrode 29. In practice, the central portion 28 can be moved by the piston 22 until coming into contact with the electrode 29.

In a variant (not illustrated), the electrode 29 opens into a space situated between the central portion 28 and the piston 22, the piston 22 being positioned between the electrode 29 and the end 26. Thereby, the extinction of arc A1 and the occurrence of arc A3, are facilitated. The current C1 is thereby completely diverted into the fuse conductor element F1.

In another variant, the central portion 28 is the only moving part inside the circuit breaker, the portions 24 and 26 remaining fixed. The central portion 28 can thereby move until coming into contact with the electrode 29.

In preferred variants, as can be seen in FIG. 6, the second electrode E2 is connected to the internal electrical conductor (to the central portion 28) via an insulating element 60, such as a gas arrestor. Such element can also be a varistor (MOV) or any other element preventing the flow of a low current.

Preferentially, if the insulating element 60 is a voltage suppressor element, the voltage threshold thereof can be low, e.g. on the order of 10 volts. In this way it is possible to prevent the electric current from flowing through the device 10 as long as no electric arc is present in the circuit breaker 4, while allowing the current to flow through the fuse conductor element F1 very quickly after the tripping of the circuit breaker and the occurrence of the electric arc A1.

In a variant, the insulating element 60 could be connected in a different place.

As a variant still, the insulating element 60 can also have a high voltage threshold, e.g. close to the nominal voltage of the system to be protected. The above has the effect of delaying the flow of current through the fuse conductor element F1, in order to give time for the electric arcs A1 and A2 to act against the flow of the current C1.

In a variant, the circuit breaker 4 is composed of a series assembly of a plurality of circuit breakers, e.g. two circuit breakers: the circuit breaker described hereinabove, and an additional circuit breaker connected in series with said circuit breaker, the connection being made by the respective terminals 6 or 8 of the two circuit breakers. In such case, the electrode E2 or the electrode 29 does not open into, strictly speaking, the breaking chamber, but preferentially emerges at the junction point between the two circuit breakers. In other words, the second electrode E2, 29 being connected to the junction between said circuit breakers.

In optional variants, within the volume delimited by the body 30 of the device 10, the free end of the third electrode E3 is separated from the free ends of the first electrode E1 and of the second electrode E2 by a fuse wall 62, shown in dotted lines in FIG. 6.

For example, the fuse wall 62 is configured, e.g. for melting under the effect of the temperature released by the electric arc A3 or for breaking under the effect of the pressure inside the device 10. The fuse wall 62 can e.g. be made of plastic or of any other electrically insulating material. The wall reduces the distance between the electrodes E1 and E3, because the electrical insulating power thereof is greater than the insulating power of air. Once the wall is broken, the arc forming between the first electrode E1 and the third electrode E3 has a reduced length, hence the energy released therefrom is reduced.

In practice, however, the device 10 described hereinabove (or any of the variants thereof) can be used. Such a wall can also be used in all or a part of the variants of the device 10 described hereinabove.

The inserts (a) and (b) shown in FIG. 7 illustrate two possible variants of encapsulation, in a common body, of all or a part of the elements of the system 2.

The insert (a) represents a first embodiment of a cartridge 70 wherein the device 10 and the fuse 12 are integrated.

A tubular (or cylindrical) body 72 delimits a first region 74 (or compartment) corresponding to the fuse 12 and a second region 76 (or compartment) corresponding to the device 10.

Preferentially, the tubular body 72 is made of an electrically insulating material, e.g. plastic, or ceramic, or of a composite material comprising glass fibers embedded in a resin matrix, or any suitable material.

The first region 74 and the second region 76 are separated by an electrically conducting wall so as to bring in contact, components present in the two regions. Advantageously, the terminal ends of the body 72 include caps 78, which can be metal caps crimped onto the tubular body 72.

For example, the first region 74 includes one or a plurality of fuse strips F2 immersed in a siliceous material, such as sand.

The second region 76 includes the electrodes E1 and E2 (emerging outside the cap 78) the electrode E3 (e.g. integrated within a metal contact piece which herein forms the wall separating the regions 74 and 76, in order to ensure an electrical connection with the fuse blades F2). Where appropriate, the second region further includes the fuse conductor element F1.

Preferentially, the second region 76 includes an electrically insulating body, e.g. formed of plastic, which covers the internal walls of the second region 76 and which serves for holding the electrodes E1 and E2 in position.

Optionally, the region 76 includes the absorbing elements 32, 34 as well as, where appropriate, the voltage suppressor element 60.

Depending on whether the voltage suppressor element 60 is present or not, the fuse conductor element F1 connects the first electrode E1 to the voltage suppressor element 60 or directly to the second electrode E2.

The insert (b) of FIG. 7 represents a second embodiment of a cartridge 80 wherein at least a part of the components of the device 10 are integrated. Such embodiment is applicable above all to the embodiment of the electrical system **2*b* illustrated in FIG. 8**.

Such embodiment differs in particular from the other embodiments of the system **2*a* in that the device 10 is made in the form of an assembly 90 wherein the fuse element F1 is associated with a second circuit breaker 92 including a pyrotechnic charge 94, a movable contact 96 and connection terminals 98**.

One of the terminals 98 is connected to the fuse 12 whereas the other terminal 98 is connected to a first electrode 100A connected to the terminal 8. A second electrode 100B connects the fuse element F1 to the central portion 28 via the voltage suppressor element 60 and a third electrode 100C. In a variant, it is possible not to use a voltage suppressor element, in which case electrode 100C is connected directly to electrode 100B.

The pyrotechnic charge 94 is connected to electrode 100B and to electrode 100A, so as to be triggered when the fuse element F1 has melted. Thereby, the system can be used for diverting the current arriving from the terminal 8 of the circuit breaker 4, towards the fuse 12.

Such solution can be used for interrupting currents of very high intensity (no arc A, no energy dissipated in the device 10).

In the insert (b) of FIG. 7, the cartridge 80 includes a tubular or cylindrical body 82 which delimits a region 84 including a fuse blade F1 immersed in a siliceous material, such as sand, and extending between the electrodes 100A and 100B. Preferentially, the tubular body 82 is made of an electrically insulating material, e.g. plastic, or ceramic, or of a composite material including glass fibers embedded in a resin matrix, or any suitable material.

Advantageously, the terminal ends of the body 82 include caps 86. Electrode 100A is arranged at one end of body 82, whereas electrodes 100B and 100C are arranged at the other end of the body 82. Preferentially, the inside of the tubular body 82 includes, on the end which carries the electrodes 100B and 100C, an electrically insulating body which serves for holding the electrodes 100C and 100B in position.

However, other examples are possible.

In certain embodiments (not shown), the device 10 can be integrated inside the circuit breaker 4. For example, the electrodes E1 and E2 are arranged in the breaking member 22, emerging from the breaking member 22, the latter being electrically conducting, whereas the electrode E3 is arranged in the body 20 of the circuit breaker 4, so as to be opposite to and aligned with the electrode E1 when the breaking member 22 is in the deployed position.

By means of the invention, the fuse 12 is connected in parallel with the circuit breaker 4 only when the circuit breaker 4 is tripped and only when the energy across the circuit breaker has exceeded a threshold value, so as to prevent an electric current from permanently flowing through the fuse 12, which could lead to premature aging of the fuse. The invention also makes it possible to guarantee a rapid opening of the circuit even when the current flowing therethrough during the tripping thereof is low or zero.

Compared to other technical solutions, the threshold value determined by the size of the fuse element F1 has many advantages in practical terms and in terms of being easy to be produced industrially. In particular, the threshold value is easy to adjust during product development and can easily be controlled during mass production. Furthermore, the threshold value is stable over time, being not very sensitive to aging (unlike e.g. a plastic membrane) and insensitive to ambient pressure. Moreover, the threshold value tends to be little dependent on the inductance value of the installation.

Any feature of one of the embodiments or variant described hereinabove can be implemented in the other embodiments and variants described.

The invention claimed is:

1. An electrical system for interrupting an electrical current, the electrical system including:
- a circuit breaker;
- a fuse, and
- an electrical device, wherein:
- the electrical device includes a body delimiting a closed internal volume, a first electrode, a second electrode and a third electrode, a free end of each electrode opening into the internal volume, said free ends of each electrode being arranged inside the internal volume, at a distance from each other and opposite with respect to the other electrodes,
- the device includes an electrically conducting element connecting the first electrode to the second electrode, the electrically conducting element being configured for changing when a current flowing therethrough exceeds a predefined threshold value, so as to interrupt an electrical contact between the first electrode and the second electrode,
- the electrical device is configured for:
  - prohibiting an electric current from flowing between the first electrode and the third electrode when the electric current or an electric voltage between the first electrode and the second electrode stays below the predefined threshold value; and
  - letting the electric current flow between the first electrode and the third electrode when said electric current or said electric voltage exceeds said threshold value
  - said electric current flow is implemented through an electric arc established between the first electrode and the second electrode, said electric arc being then diverted to be established between the first electrode and the third electrode.

2. The electrical system according to claim 1, wherein the electrically conducting element is a fuse element, which is configured for melting when a current flowing therethrough exceeds said threshold value so as to interrupt an electrical contact between the first electrode and the second electrode.

3. The electrical system device according to claim 1, wherein the electrically conducting element is a deformable shape memory conductor element, which is configured for deforming and interrupting an electrical contact between the first electrode and the second electrode when the current flowing therethrough exceeds said threshold value.

4. The electrical system according to claim 1, wherein within the internal volume, the free end of the third electrode is separated by a fuse wall from the free ends of the first electrode and of the second electrode.

5. The electrical system according to claim 1, wherein the second electrode is connected to an internal electrical conductor of the circuit breaker before or after actuating the circuit breaker, the internal conductor being coupled to at least one of terminals of the circuit breaker.

6. The electrical system according to claim 4, wherein the second electrode is connected to the internal electrical conductor through an insulating member.

7. The electrical system according to claim 1, wherein the system includes an additional circuit breaker connected in series with said circuit breaker by the respective terminals thereof, the second electrode being connected at the junction between said circuit breakers.

8. The electrical system according to claim 1, wherein the second electrode is arranged in a breaking chamber opposite to and at a distance from one of the terminals of the circuit breaker.

9. The electrical system according to claim 1, wherein the fuse and the electrical device are integrated within the same body.

10. The electrical system according to claim 1, wherein the circuit breaker and the electrical device are integrated within the same body.

11. The electrical system according to claim 1, wherein the circuit breaker is a pyrotechnic circuit breaker.

12. The electrical system according to claim 1, wherein the insulating member is a voltage suppressor element.

13. The electrical system according to claim 1, wherein the insulating member is a varistor.

* * * * *